United States Patent [19]

Gosser

[11] 3,920,721

[45] Nov. 18, 1975

[54] HYDROCYANATION OF OLEFINS

[75] Inventor: Lawrence Wayne Gosser, Wilmington, Del.

[73] Assignee: E. I. Du Pont de Nemours & Company, Wilmington, Del.

[22] Filed: Sept. 18, 1974

[21] Appl. No.: 507,218

[52] U.S. Cl.......... 260/465.8 R; 260/404; 260/464; 260/465 R; 260/465 C; 260/465.1; 260/465.3; 260/465.4; 260/465.9

[51] Int. Cl.$^2$...................................... C07C 120/02

[58] Field of Search.......... 260/465.3, 465.8, 465.9, 260/465.4, 465.1, 465 C, 464, 465 R

[56] References Cited
UNITED STATES PATENTS

| | | | |
|---|---|---|---|
| 3,579,560 | 5/1971 | Drinkard, Jr. et al. | 260/465.9 |
| 3,655,723 | 4/1972 | Drinkard, Jr. | 260/465.3 |

*Primary Examiner*—Joseph P. Brust

[57] ABSTRACT

Olefins are hydrocyanated by mixing together 1. an olefinically unsaturated compound of 2 to 20 carbon atoms,
2. hydrogen cyanide,
3. a ligand-complexed cobalt compound of the formula
   $[(YO)_3P]_{4-x}CoHL_x$ or
   $[(YO)_3P]_3Co[C_6R_4OP(OY)_2]$
   in which
   a. the Y's, alike or different, are phenyl or phenyl substituted with lower alkyl, lower alkoxy, lower alkylcarbonyl, nitrile, or phenyl;
   b. the L's, alike or different, are a ligand of the formula $R^1(CN)_n$, where $n$ is 1 or 2; when $n$ is 1, $R^1$ is a hydrocarbyl of 1–18 carbon atoms selected from the group consisting of alkyl, alkenyl, aryl or alkaryl; and when $n$ is 2, $R^1$ is a hydrocarbylene of 1–18 carbon atoms selected from the group consisting of alkylene, alkenylene, arylene and alkarylene;
   c. $x$ is an integer from 0 to 2; and
   d. the R's, alike or different, are hydrogen or lower alkyl, and
4. a nonoxidizing Lewis acid promoter and allowing the reaction to take place at a temperature of about −25° to 200°C.

11 Claims, No Drawings

HYDROCYANATION OF OLEFINS

BACKGROUND OF THE INVENTION

Field of the Invention

This invention relates to a catalytic process for adding hydrogen cyanide to olefins.

Background of the Invention

The Drinkard et al U.S. Pat. Nos. 3,579,560, 3,655,723 and 3,775,461, show hydrocyanation of olefins using as catalysts, cobalt compounds in which the cobalt has a valence of 0.25 to 1.75. These catalysts are prepared either by treating a conventional cobalt compound wherein the cobalt has a valence of −1 such as $[(C_6H_5O)_3P]_4CoH$ with an oxidizing agent such as $FeCl_3$ or $CoCl_2$, or by treating a cobalt compound in which the cobalt is a salt of a +2 or +3 valent complex with a reducing agent. The use of Lewis acid promoters is taught for these catalysts.

SUMMARY OF THE INVENTION

I have now discovered a process for hydrocyanating olefins which comprises mixing together 1. an olefinically unsaturated compound of 2 to 20 carbon atoms,
2. hydrogen cyanide,
3. 0.0002 to 0.5 mole, per mole of olefin, of a ligand-complexed cobalt compound of the formula
   $[(YO)_3P]_{4-x}CoHL_x$ or
   $[(YO)_3P]_3Co[C_6R_4OP(OY)_2]$ in which
   a. the Y's, alike or different, are phenyl or phenyl substituted with lower alkyl, lower alkoxy, lower alkylcarbonyl, nitrile, or phenyl;
   b. the L's, alike or different, are a ligand of the formula $R^1(CN)_n$, where $n$ is 1 or 2; when $n$ is 1, $R^1$ is a hydrocarbyl of 1–18 carbon atoms selected from the group consisting of alkyl, alkenyl, aryl or alkaryl; and when $n$ is 2, $R^1$ is a hydrocarbylene of 1–18 carbon atoms selected from the group consisting of alkylene, alkenylene, arylene and alkarylene;
   c. $x$ is an integer from 0 to 2; and
   d. the R's, alike or different, are hydrogen or lower alkyl, and
4. a nonoxidizing Lewis acid promoter in a mole ratio of promoter to cobalt compound of 1:16 to 20:1, in the absence of an oxidizing agent for the cobalt compound and allowing the reaction to take place at a temperature of about −25° to 200°C.

DETAILED DESCRIPTION OF THE INVENTION

The method of this invention comprises mixing together 1. an olefin
2. hydrogen cyanide
3. a ligand-complexed cobalt compound, and
4. a nonoxidizing Lewis acid promoter. The term "mixing" is used herein to define the ingredients which are added and is intended to include ingredients which may be selectively premixed. When operating in accordance with this invention using a ligand-complexed cobalt compound in which the cobalt has a valence of −1 and a nonoxidizing Lewis acid promoter, it is not necessary to add an oxidizing agent as taught by Drinkard et al. in U.S. Pat. Nos. 3,579,560, 3,655,723 and 3,775,461. In other words, the reaction of this invention is carried out in the absence of an oxidizing agent for the cobalt compound.

The olefins which may be hydrocyanated in accordance with this invention are olefinically unsaturated compounds of 2–20 carbon atoms, that is, hydrocarbons having one or two aliphatic carbon-carbon double bonds, and substituted hydrocarbons having 1–4 substituents such as cyano, formyl, lower alkoxycarbonyl, lower alkylcarbonyl, and arylcarbonyl which are isolated from the carbon-carbon double bond by at least one carbon. Suitable olefins include ethylene, propylene, butene-1, butene-2, isobutene, pentene-2, hexene-2, decene-1, dodecene-2, octadecene-1, eicosene-2, butadiene-1,3, hexadiene-1,4, styrene, 3-pentenenitrile, 4-pentenenitrile, 2-methyl-3-butenenitrile, 10-undecenal, methyl 10-undecenoate, 3-methyl-1-hexene-5-one, and the like. The preferred olefins are 3-pentenenitrile and 4-pentenenitrile.

The hydrocyanation reaction is carried out in the presence of hydrogen cyanide. The amount of hydrogen cyanide used may vary over wide limits since it does not affect the course of the reaction. In a continuous process the hydrogen cyanide can be fed at a rate such that it is consumed as fast as it is fed. On the other hand, gross excess amounts of hydrogen cyanide may also be used.

The hydrocyanation reaction of this invention is carried out using a ligand-complexed cobalt compound of the formula
$[(YO)_3P]_{4-x}CoHL_x$ or
$[(YO)_3P]_3Co[C_6R_4OP(OY)_2]$ in which the Y's, x, L's, and R's are as defined above. Typical cobalt compounds include tetrakis(triphenylphosphite)- cobalt hydride, 2-(diphenoxyphosphinoxy)phenyltris(triphenylphosphite) cobalt and acetonitriletris(triphenylphosphite)- cobalt hydride.

The amount of cobalt compound present may vary from about 0.0002 to 0.5 mole per mole of olefin. Preferably the cobalt compound is present in the amount of about 0.01 to 0.1 mole per mole of olefin.

These cobalt compounds are prepared in a variety of ways. The cobalt hydrides may be prepared by reducing a cobalt salt in the presence of a triaryl phosphite using an appropriate reducing agent such as zinc dust or sodium borohydride. For example, $[(C_6H_5O)_3P]_4CoH$ can be prepared by reduction of anhydrous cobalt chloride with excess zinc dust in a solution of triphenyl phosphite in acetonitrile or 3-pentenenitrile. Similarly, cobalt nitrate hydrate may be reduced with sodium borohydride in the presence of a triaryl phosphite.

The phosphinoxyphenyl cobalt compounds are prepared by reacting π-cyclo-octenyl-π-cyclo-octa-1,5-dienecobalt, $Co(C_8H_{13})(C_8H_{12})$, with the proper triarylphosphite at room temperature. The cobalt nitrile compounds can be prepared in liquid solution by reducing π-cyclo- octenyl-π-cyclo-octa-1,5-dienecobalt with hydrogen in the presence of a stoichiometric quantity of at least one triarylphosphite and an excess of at least one organonitrile. Usually the organonitrile will be employed as the reaction solvent. It is not necessary to isolate the cobalt compounds before use.

Suitable triarylphosphites for use in these reactions include those containing aryl groups such as phenyl; o-,m- and p-tolyl; o-,m- and p-ethylphenyl; p-n- propylphenyl; m- and p-isopropylphenyl; 2,4-diisopropylphenyl; p-methoxyphenyl; 2,4-dimethoxyphenyl; 2,3- and 2,4-dimethylphenyl; m- and p- tert.- butylphenyl; p-n- butoxyphenyl; p-acetylphenyl; and triarylphosphites which contain a mixture of the above groups.

Many of the phosphites used to prepare these complexes are commercially available materials. They can be prepared by reaction of the appropriate phenol with $PCl_3$ in the presence of triethylamine. Preparation of the phosphites is described by Kosolapoff in Organophosphorus Compounds, J. Wiley & Sons, N.Y., N.Y. (1950).

A wide range of aliphatic or aromatic nitriles of the formula $R(CN)_x$ where R is an aliphatic or aromatic group of up to 18 carbons may be used in the preparation of the cobalt nitrile compound. The groups may be straight-chained, branched, saturated or unsaturated or divalent and attached to more than one nitrile group. Typical of the many useful classes of nitriles are acetonitrile, pivalonitrile, 3-pentenenitrile, 4-pentenenitrile, methyl glutaronitrile, 2methyl-3-butenenitrile, ethylsuccinonitrile, cyclohexyl cyanide, benzyl cyanide, benzonitrile, adiponitrile and terephthalonitrile.

The process of this invention is carried out using a nonoxidizing Lewis acid promoter. Suitable promoters include triarylborons and cationic forms of metals such as beryllium, zinc, cadmium, aluminum, gallium, indium, scandium, titanium, zirconium, hafnium, vanadium, niobium, chromium, molybdenum, tungsten, manganese, iron, copper, germanium, tin, lead, and the rare earths. The preferred promoters are the triarylborons and cationic forms of the metals: beryllium(II), zinc(II), cadmium(II), aluminum(III), gallium (III), indium(III), scandium(III), titanium(III), zirconium(IV), hafnium(IV), vanadium(III), niobium(IV), chromium(III), molybdenum(III), tungsten(IV), manganese(II), iron(II), copper(I), germanium(IV), tin(II), and lead (II). Typical promoters of this type include salts of the above metals in which the anion is fluoride, chloride, bromide, iodide, cyanide, acetate, and the like. Particularly preferred promoters are triphenylboron, $SnCl_2$, $SnBr_2$, $ZnCl_2$, $ZnBr_2$, $FeCl_2$, $FeI_2$, $AlCl_3$, and $AlBr_3$. The Lewis acid promoter may be used in a mole ratio of promotor to cobalt compound of about 1:16 to 20:1. Preferably the amount of Lewis acid used is in a mole ratio of promoter to cobalt compound of about 1:5 to 10:1.

The reaction mixture may also contain up to about 95% by weight, based on the total reaction mixture, of additional phosphite ligand of the formula $(YO)_3P$ beyond that present in the cobalt compound. Preferably the ligand is the same as the ligand in the cobalt complex.

Time is not a critical factor in the reaction of this invention. As soon as the reactants are brought together, at least some of the hydrocyanated product is formed almost immediately. For optimum yields in a batch operation, it is preferred to continue the reaction for a period from about a few minutes to about 24 hours or more after the last of the reactants has been added.

The pressure used is also not critical in the process of this invention. Pressures both above and below atmospheric pressure may be employed. It is preferred to operate at the autogeneous pressure obtained by conducting the reaction in a closed system.

No added diluent or reaction medium is required in this process. If it is desired to add a diluent, e.g., to promote miscibility of the reactants, it must be one that is inert toward the reactants and products. Suitable diluents include liquid hydrocarbons such as hexane, benzene, and toluene; ethers such as diethyl ether and tetrahydrofuran; saturated aliphatic and aromatic nitriles such as acetonitrile, benzonitrile, and the like.

The process of this invention is particularly suitable for the production of adiponitrile by the hydrocyanation of 3-pentenenitrile, 4-pentenenitrile, or a mixture thereof. In the most preferred embodiment 3-pentenenitrile is hydrocyanated by mixing it with hydrogen cyanide, tetrakis(triphenylphosphite)cobalt hydride, triphenylphosphite and a chloride or bromide of zinc, iron or aluminum.

The nitrile products of this invention are widely useful as is well known to those skilled in the art. The nitriles may also be reduced to amines of known utility. Adiponitrile, the preferred product can be hydrogenated to hexamethylenediamine or hydrolyzed to adipic acid, both of which are valuable intermediates in the production of nylon.

EXAMPLES OF THE INVENTION

The following examples, illustrating the preparation of cobalt complexes and their use in the hydrocyanation of various olefins, are given without any intention that the invention be limited thereto. All percentages are by weight. All temperatures are in degrees centigrade unless otherwise specified.

COBALT COMPLEXES

Examples A and B illustrate the preparation of cobalt complexes. These complexes were prepared with appropriate techniques to protect the reaction mixtures and products from contact with air. Glove boxes filled with a nitrogen atmosphere were used in these examples.

EXAMPLE A

Preparation of $[(C_6H_5O)_3P]_4CoH$

A three-necked glass flask equipped with nitrogen gas inlet, a water cooled reflux condenser and a mechanical stirrer, was charged with 14.5 g. (0.05 mole) of cobalt nitrate hexahydrate and 400 ml. of acetonitrile. This salt was brought into solution, and 75 g. (0.25 mole) of triphenyl phosphite was added. The solution was maintained at room temperature, and 3.0 g. (0.082 mole) of sodium borohydride was added in small portions over a period of about 2 hours. A yellow precipitate formed. The percipitate was collected, washed with methanol, dried and redissolved from the filter with 200 ml. of methylene chloride to remove inorganic salts. The methylene chloride solution of tetrakis(triphenylphosphite)cobalt hydride was concentrated to 75 ml. under reduced pressure and then 300 ml. of pentane was added. The yellow solid product was collected, washed with pentane and dried. The structure was confirmed by examination of the $^1H$ nmr spectrum.

EXAMPLE B

Preparation of $[(C_6H_5O)_3P]_3 CoC_6H_4OP(OC_6H_5)_2$

The starting material, $\pi$-cyclo-octenyl-$\pi$-cyclo- octa-1,5-diene cobalt, $Co(C_8H_{13})(C_8H_{12})$, was prepared by the procedure described by Otsuka and Rossi in Jour. Chem. Soc., 1968A, p. 2630.

To a solution of 13 g. of triphenyl phosphite in 20 ml. of benzene was added 3.6 g. of $Co(C_8H_{12})(C_8H_{13})$. The resulting solution was left at room temperature overnight. The benzene was evaporated under reduced pressure and the residue was triturated with hexane.

The hexane was evaporated and the crude solid product was collected and washed with hexane. Recrystallization from acetone gave 7.0 g. of pale yellow solid, m.p. ca. 190°–195°with decomposition.

Anal. Calc'd. for $C_{72}H_{59}O_{12}P_4Co$: C, 66.57; H, 4.58;
Co, 4.54.
Found: C, 66.38; H, 4.83;
Co, 4.59.

The $^1H$ and $^{31}P$ nmr spectra are in accord with a structure which has three normally coordinated triphenylphosphite units bound to cobalt as well as one triphenylphosphite unit which is bound to the cobalt both through phosphorus in the usual manner and also by a cobalt-carbon bond to an ortho position on one of the triphenylphosphite phenyl rings. A bond to cobalt then replaces one of the bonds to hydrogen at an ortho position of the triphenylphosphite ligand. The cobalt compound is believed to have the structure

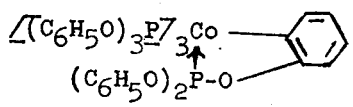

This mode of bonding is discussed by G. W. Parshall in Accounts of Chemical Research, Vol. 3, p. 139 (1970).

EXAMPLE C

Preparation of 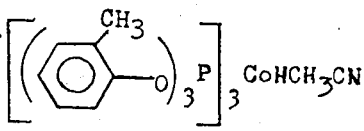

A solution of 7.5 g. of tri-o-tolyl phosphite in 40 ml. of acetonitrile was prepared and 2.0 g. of $Co(C_8H_{12})(C_8H_{13})$ was dissolved in this solution. After stirring under 50 psig hydrogen for 4.5 hours, the pressure was released and the solution was cooled to −35°. The yellow solid was collected, washed with acetonitrile and dried (7.8g.) A 1.0 g. sample was recrystallized from benzene-acetonitrile to give 0.87 g. of yellow solid, mp. (evac. cap.) 140°–145°. (dec.).

| 220 MHz nmr in $C_6D_6$.TMS: | quartet (J 55), 22.4 ppm upfield from TMS. |
|---|---|
| 36.43 MHz$^{31}$P-nmr in toluene: | single broad peak 139 ppm downfield from external 85% $H_3PO_4$. |
| Infrared (Nujol): | coordinated nitrile 2280 cm$^{-1}$. |

Anal. Calcd. for $C_{65}H_{67}O_9P_3NCo$:
C, 67.41; H, 5.83; N, 1.20; P, 8.02; Co, 5.08
Found: C, 66.96; H, 5.84; N, 1.31; P, 8.22; Co, 5.12

EXAMPLE D

Preparation of $[(C_6H_5O)_3P]_3CoHCH_3CN$

A solution of 1.34 g. of triphenylphosphite in 8 ml. of acetonitrile was combined with a solution of 0.40 g. of $Co(C_8H_{12})(C_8H_{13})$ in 2 ml. of tetrahydrofuran in a pressure bottle. The bottle was evacuated and filled with 50 psig hydrogen. Within four minutes at room temperature most of the initial red color had disappeared and yellow solid had formed. The bottle was left under 50 psig hydrogen pressure at 0° for 15 minutes before venting the hydrogen. The solid was collected, washed with acetonitrile and dried, yield 1.1 g. of yellow powder; mp. (evac. cap.) ca. 145°C. (dec.) 220 MHz nmr. of $C_6D_6$-TMS solution: quartet (J 53), 22.1 ppm. upfield from TMS. 36.43 MHz$^{31}$p-nmr. in benzene solution; one broad peak 144 ppm. downfield from external 85% of $H_3PO_4$. Infrared (Nujol) showed coordinated nitrile at 2280 cm.$^{-}$.

Anal. Calcd. for $L_3CoHCH_3CN$, $C_{56}H_{49}NO_9P_3Co$:
C, 65.10; H, 4.79; N, 1.35; P, 9.10; Co, 5.71
Found: C, 65.15; H, 4.78; N, 1.33; P, 9.30; Co, 5.68

This material could be recrystallized satisfactorily from benzene solution by adding acetonitrile.

HYDROCYANATION OF OLEFINS

The following examples were carried out using the cobalt complexes prepared in Examples A to D.

EXAMPLES 1–9

Hydrocyanation of 3-Pentenentrile

Hydrogen cyanide (HCN) was carefully fractionally distilled to remove impurities and stabilizers, and then mixed with 3-pentenenitrile (3PN), which had been distilled under nitrogen, to from an 8M solution. The resulting solution was stored at ca. 5° in a glass bottle with a rubber septum closure.

The hydrocyanation reactions were carried out in 2 ml. ampules closed with rubber septums. Each ampule was charged in a nitrogen filled glove box with $[(C_6H_5O)_3P]_4CoH$, the promoter indicated in Table I, the phosphite ligand indicated in Table I, and 3PN. A sample of the HCN/3PN solution was added by syringe and the ampule was heated as indicated. Additional HCN/3PN solution was added as indicated in Table I and the mixture was heated again. A product sample was then withdrawn by syringe for gas chromatographic analysis with an internal standard added. A ⅛ inch × 10 foot column packed with 3% ECNSS-M on 60/80 mesh Gas-Chrom Q was used. (Packing from Applied Science Laboratory, Inc., State College, Pa.). Computer analysis of the flame detector output converted the areas at the appropriate retention times to weight percentages. Where more than one amount of HCN/3PN solution and time are given in TABLE I, the HCN/3PN solution was added at the beginning of each time period and the analysis was done at the end of the last period. Triphenylboron, a white crystalline solid, was used as purchased. The zinc and tin salts were dried at 100° under vacuum before use. The zinc, tin, and boron compounds were usually dissolved in the 3 PN before addition of the other components. The details and data obtained are given in Table I.

TABLE I

| Example | Cat, g. | 3PN ml. | Promoter, mg. | $(C_6H_5O)_3P$, μl | HCN/3PN, μl | Time, hr. | Temp. | ESN | Product, % MGN | ADN |
|---|---|---|---|---|---|---|---|---|---|---|
| | | | $ZnCl_2$ | | | | | | | |
| 1 | 0.10 | 0.5 | 14 | 60 | 50 | 17 | 80 | 0.06 | 0.77 | 3.1 |
| 2 | 0.10 | 0.5 | 16 | 60 | 50/50 | 17/17 | 80 | 0.07 | 1.04 | 5.7 |
| 3 | 0.13 | 0.5 | 16 | 0 | 50 | 17 | 120 | 0.04 | 0.58 | 1.42 |
| 4 | 0.13 | 0.5 | 16 | 260 | 50 | 17 | 120 | — | 0.25 | 1.34 |
| 5 | 0.10 | 0.25 | 8 | 500 | 50/50 | 17/17 | 120/100 | 0.06 | 0.67 | 2.79 |
| | | | $(C_6H_5)_3B$ | | | | | | | |
| 6 | 0.10 | 0.5 | 25 | 60 | 50/50 | 17/17 | 80 | — | 0.52 | 1.33 |
| 7 | 0.10 | 0.5 | 25 | 60 | 50/50/50 | 3/17/100 | 50 | — | 0.07 | 0.42 |
| | | | $SnCl_2$ | | | | | | | |
| 8 | 0.20 | 1.0 | 40 | 150 | 100/50 | 17/17 | 80 | 0.11 | 0.67 | 2.26 |
| | | | $SnBr_2$ | | | | | | | |
| 9 | 0.20 | 1.0 | 56 | 150 | 100/50 | 17/17 | 80 | — | 0.19 | 0.87 |

EXAMPLE 10-12

The procedure of Examples 1–9 was repeated except that $[(C_6H_5O)_3P]_3CoC_6H_4OP(OC_6H_5)_2$ was used as the cobalt complex. The details and data are given in Table II.

TABLE II

| Example | Cat., g. | 3PN, ml. | Promoter, mg. | $(C_6H_5O)_3P$, μl | HCN/3PN, μl | Time, hr. | Temp. | ESN | Product, % MGN | ADN |
|---|---|---|---|---|---|---|---|---|---|---|
| | | | $ZnCl_2$ | | | | | | | |
| 10. | 0.1 | 0.5 | 14 | 60 | 50 | 17 | 80 | — | 0.45 | 1.48 |
| | | | $(C_6H_5)_3B$ | | | | | | | |
| 11. | 0.1 | 0.5 | 25 | 60 | 50/50 | 17/17 | 80 | — | 0.38 | 0.44 |
| | | | $FeBr_2$ | | | | | | | |
| 12. | 0.1 | 0.5 | 22 | — | 50 | 17 | 80 | 0.153 | 0.69 | 1.79 |

EXAMPLES 13-23

These examples were carried out using $[(C_6H_5O)_3P]_4CoH$ and a promoter following the procedure of Examples 1–9. The ferrous bromide and ferrous iodide used in these examples were nominally anhydrous commercial samples. A ⅛-inch × 6 foot column packed with 5% ECNSS-M of 80/100 mesh Gas-Chom Q was used for the gas chromatographic analysis. A thermal conductivity detector was used. Table III gives the peak heights in mm. at the appropriate retention times for 2-methylglutaronitrile (MGN) and adiponitrile (ADN). With these conditions 1% ADN or MGN in a solution would give a peak height equivalent to ca. 25–50 mm. The details and data are given in Table III. Although not listed in the table, peaks at the retention time of ethylsuccinonitrile were generally present at about 10 to 50% of the MGN peak heights.

TABLE III

| Example | Cat,g | 3PN, ml | Promoter, mg | $(C_6H_5)_3P$, μl | HCN/3PN, μl | Time, hr | Temp. | Peak heights (mm) MGN | ADN |
|---|---|---|---|---|---|---|---|---|---|
| | | | $ZnCl_2$ | | | | | | |
| 13 | 0.13 | 0.5 | 13 | 100 | 50 | 17 | 100 | 17 | 55 |
| 14 | 0.13 | 0.5 | 2.6 | 100 | 50 | 17 | 100 | 48 | 4 |
| 15 | 0.13 | 0.5 | 13 | 100 | 50 | 17 | 80 | 20 | 84 |
| 16 | 0.13 | 0.5 | 2.6 | 100 | 50 | 17 | 80 | 4 | 3 |
| 17 | 0.10 | 0.25 | 100 | 250 | 50 | 17 | 100 | 6 | 33 |
| 18 | 0.10 | 0.5 | 100 | 0 | 50 | 17 | 100 | 17 | 1 |
| | | | $FeBr_2$ | | | | | | |
| 19 | 0.13 | 0.5 | 25 | 0 | 50 | 17 | 80 | 32 | 81 |
| | | | $FeI_2$ | | | | | | |
| 20 | 0.13 | 0.5 | 35 | 0 | 50 | 17 | 80 | 20 | 22 |
| | | | $ZnBr_2$ | | | | | | |
| 21 | 0.13 | 0.5 | 23 | 100 | 50 | 17 | 100 | 20 | 38 |
| | | | $AlCl_3$ | | | | | | |
| 22 | 0.13 | 0.5 | 13 | 100 | 50 | 17 | 80 | 43 | 37 |
| 23 | 0.13 | 0.5 | 13 | 100 | 50 | 17 | 120 | 50 | 112 |

EXAMPLE 24

The procedure of Examples 13–23 was repeated using 0.13 g. of $[(C_6H_5O)_3P]_3CoC_6H_4OP(OC_6H_5)_2$, 0.5 ml. of 3PN, 23 mg. of $ZnBr_2$, 100 μl of $(C_6H_5O)_3P$, and 50 μl of HCN/3PN solution. The reaction period was 17 hours at 100°. The peak heights were 19 mm. for MGN and 16 mm. for ADN.

EXAMPLE 25

Hydrocyanation of 4-Pentenenitrile

The procedure of Examples 13–23 was repeated using 0.13 g. of $[(C_6H_5O)_3P]_3CoC_6H_4OP(OC_6H_5)_2$, 0.50 ml. of 4-pentenenitrile (4PN), 10 mg. of $ZnCl_2$, 60 μl of $(C_6H_5O)_3P$, and 50 μl of a solution of ca. 11M HCN in acetonitrile. The reaction period was ca. 17 hours with heat from an 80° oil bath. The peak heights were 61 mm. for MGN and 95 mm. for ADN.

EXAMPLES 26–28

The procedure of Examples 13–23 was repeated using cobalt catalyst as indicated, 0.20 ml. of 4PN, ca. 10 mg. of AnCl$_2$, 0.25 ml. of the indicated ligand and 35 μl of ca. 11M HCN in CH$_3$CN. The mixture was warmed overnight in an 80° oil bath. The details are given in Table IV.

TABLE IV

| Catalysts Cobalt Compound | g. | Ligand | Peak heights (mm.) MGN | ADN |
|---|---|---|---|---|
| [(o-CH$_3$-C$_6$H$_4$-O)$_3$P]$_3$CoHCH$_3$CN | 0.10 | (o-CH$_3$-C$_6$H$_4$-O)$_3$P | 91 | 36 |
| [(o-CH$_3$-C$_6$H$_4$-O)$_3$P]$_4$CoH | 0.13 | (o-CH$_3$-C$_6$H$_4$-O)$_3$P | 64 | 30 |
| [(C$_6$H$_5$O)$_3$P]$_3$—CoHCH$_3$CN | 0.10 | (C$_6$H$_5$O)$_3$P | 5 | 3 |

EXAMPLE 29

The procedure of Examples 13–23 was repeated using 0.13 g. of [(C$_6$H$_5$O)$_3$P]$_4$CoH, 60 μl of (C$_6$H$_5$O)$_3$P, 0.5 ml. of 4PN, ca. 10 mg. of ZnCl$_2$, and 50 μl of ca. 11M HCN in acetonitrile. The mixture was warmed in a 100° oil bath for 2 hours. VPC analysis showed a 72 mm. peak for MGN and a 155 mm. peak for ADN.

EXAMPLES 30–31

Hydrocyanation of Butadiene

A nitrogen filled glove box was used to charge 0.10 g. of cobalt compound and a solution containing 0.015 g. of ZnCl$_2$ and 5 ml. of tetrahydrofuran into a ca. 20 ml. glass pressure bottle. There was then condensed into the pressure bottle (cooled to ca. 0°) ca. 7 mmoles or ca. 350 mg. of butadiene. Fifty ul of HCN/THF solution (ca. 8M) was added by syringe to the 0° mixture. The bottles were then warmed in a 75° oil bath overnight. The bottles were cooled to room temperature and the pressure, if any, was vented. The residual liquid was analyzed by gas chromatography using a procedure similar to that of Examples 1–9 except that a ⅛ inch × 20 foot column of terephthalic acid terminated Carbowax 20M (4% on 80/100 mesh Gas-Chrom W) was used. The results of the VPC analysis of the residual liquids are summarized in Table V. There were also small amounts of 2-methyl-2-butenenitrile and 2-methyl-3-butene-nitrile formed in some cases which are not shown in Table V.

TABLE V

| Example | Cobalt Compound Structure | Products, % 2-pentenenitrile | 3-pentenenitrile |
|---|---|---|---|
| 30 | [(C$_6$H$_5$O)$_3$P]$_4$CoH | 2.98 | 3.93 |
| 31 | [(C$_6$H$_5$O)$_3$P]$_3$CoC$_6$H$_4$OP(OC$_6$H$_5$)$_2$ | 2.78 | 3.10 |

EXAMPLE 32

Hydrocyanation of 1-Hexene

A small serum ampoule was charged with 0.20 g. of [(C$_6$H$_5$O)$_3$P]$_4$CoH, 25 mg. of ZnCl$_2$, 0.50 ml. of (C$_6$H$_5$O)$_3$P, and 0.50 ml. of 1-hexene using a nitrogen filled glove box. The closed ampoule was then transferred to a fume hood and 50 μl of a ca. 11M HCN solution in acetonitrile was added with a hypodermic syringe. (The HCN had been purified. The acetonitrile was nominally anhydrous commercial material). The ampoule was then heated in a 120° oil bath for ca. 17 hours. A sample was withdrawn for analysis by gas chromatography and mass spectrometry. The combined VPC-mass spectrometry technique indicated the presence of C$_7$ nitriles.

EXAMPLE 33

Hydrocyanation of Styrene

A mixture was prepared from 0.13 g. of [(C$_6$H$_5$O)$_3$P]$_4$CoH, 0.50 ml. of (C$_6$H$_5$O)$_3$P, ca. 10 mg. of ZnCl$_2$, and 0.25 ml. of tert-butylpyro-catechol-stabilized styrene. A 50 μl portion of ca. 11M HCN in CH$_3$CN was added, and the mixture was warmed overnight in an 80° oil bath. Analysis by VPC-mass spectrometry showed the presence of

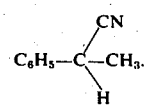

This material was also identified when an identical mixture was warmed overnight with a 100° oil bath.

EXAMPLE 34

Continous Addition of HCN

A mixture of 0.65 g. of [C$_6$H$_5$O)$_3$P]$_4$CoH, 0.30 ml. of (C$_6$H$_5$O)$_3$P, 2.50 ml. of 3PN and 65 mg. of ZnCl$_2$ was placed in a small flask fitted with a rubber septum to keep out air. The flask was transferred from a nitrogen filled glove box to a fume hood and was there heated in an 80°C. oil bath. The mixture was stirred with a magnetic stirrer. A ca. 8M solution of HCN in 3PN was added continuously at a rate of ca. 25 μl per hour for ca. 7 hours by means of a syringe pump. Analysis of the product as in Examples 13–23 showed a peak at the time for MGN with a peak height of 130 mm. and a 300 mm. peak at the time for ADN.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. The method of hydrocyanating olefins which comprises mixing together
  1. an olefinically unsaturated compound of 2 to 20 carbon atoms selected from the group consisting of hydrocarbons having one or two aliphatic carbon-carbon double bonds, and substituted hydrocarbons having 1–4 substituents selected from the group consisting of cyano, formyl, lower alkoxycarbonyl, lower alkylcarbonyl, and arylcarbonyl which are isolated from the carbon-carbon double bond by at least one carbon,
  2. hydrogen cyanide,
  3. 0.0002 to 0.5 mole, per mole of olefin, of a ligand-complexed cobalt compound of the formula
     $[(YO)_3P]_{4-x}CoHL_x$ or
     $[(YO)_3P]_3Co[C_6R_4OP(OY)_2]$
     in which
     a. the Y's, alike or different, are phenyl or phenyl substituted with lower alkyl, lower alkoxy, lower alkylcarbonyl, nitrile, or phenyl;
     b. the L's, alike or different, are a ligand of the formula $R^1(CN)_n$, where $n$ is 1 or 2; when $n$ is 1, $R^1$ is a hydrocarbyl of 1–18 carbon atoms selected from the group consisting of alkyl, alkenyl, aryl or alkaryl; and when $n$ is 2, $R^1$ is a hydrocarbylene of 1–8 carbon atoms selected from the group consisting of alkylene, alkenylene, arylene and alkarylene;
     c. x is an integer from 0 to 2; and
     d. the R's, alike or different, are hydrogen or lower alkyl, and
  4. a nonoxidizing Lewis acid promoter in a mole ratio of promoter to cobalt compound of 1:16 to 20:1, in the absence of an oxidizing agent for the cobalt compound and allowing the reaction to take place at a temperature of −25°C. to 200°C whereby hydrogen cyanide is added to an olefinically unsaturated carbon-carbon double bond.

2. The method of claim 1 in which the nonoxidizing Lewis acid promoter is selected from the group consisting of triarylborons and cationic forms of beryllium (II), zinc (II), cadmium (II), aluminum (III), gallium (III), indium (III), scandium (III), titanium (III), zirconium (IV), hafnium (IV), vanadium (III), niobium (IV), chromium (III), molybdenum (III), tungsten (IV), manganese (II), iron (II), copper (I), germanium (IV), tin (II), and lead (II).

3. The method of claim 2 in which the olefinically unsaturated compound is 3-pentenenitrile or 4-pentenenitrile.

4. The method of claim 3 in which the mixture contains 0.01 to 0.1 mole of cobalt compound per mole of olefin.

5. The method of claim 4 in which the Lewis acid promoter is present in a mole ratio of promoter to cobalt compound in the range of 1:5 to 10:1.

6. The method of claim 5 in which the mixture also contains up to 95% by weight, based on the total reaction mixture, of additional phosphite ligand of the formula
   $(YO)_3P$
   beyond that present in the cobalt compound.

7. The method of claim 6 in which the nonoxidizing Lewis acid promoter is selected from the group consisting of triphenylboron, $SnCl_2$, $SnBr_2$, $ZnCl_2$, $ZnBr_2$, $FeCl_2$, $FeBr_2$, $FeI_2$, $AlCl_3$ and $AlBr_3$.

8. The method of claim 7 in which the cobalt compound is of the formula
   $[(YO)_3P]_4CoH$.

9. The method of claim 8 in which the cobalt compound is tetrakis(triphenylphosphite)cobalt hydride.

10. The method of claim 9 in which the additional phosphite ligand is triphenyl phosphite.

11. The method of claim 10 in which the Lewis acid promoter is a chloride or bromide of zinc, iron or aluminum.

* * * * *

UNITED STATES PATENT OFFICE
CERTIFICATE OF CORRECTION

PATENT NO. : 3,920,721
DATED : November 18, 1975
INVENTOR(S) : Lawrence Wayne Gosser It is certified that error appears in the above-identified patent and that said Letters Patent are hereby corrected as shown below:

Column 3, line 39, "$FeCl_2$, $FeI_2$," should read --$FeCl_2$, $FeBr_2$, $FeI_2$, --.

Column 6, line 17, "$MHz\ ^{31}p$-nmr." should read --$MHz\ ^{31}p$-nmr.--.

Column 6, line 20, "cm.⁻" should read --$cm.^{-1}$--.

Column 7, line 18, "EXAMPLE" should read --EXAMPLES--.

Column 9, line 5, "$AnCl_2$" should read --$ZnCl_2$--.

Column 10, line 67, "ca. 7 hours" should read --ca. 37 hours--.

Column 11, line 28, "$[(YO)_3P]_4\_CoHL_x$" should read --$[(YO)_3P]_{4-x}CoHL_x$--.

Signed and Sealed this

Seventh Day of September 1976

[SEAL]

Attest:

RUTH C. MASON
*Attesting Officer*

C. MARSHALL DANN
*Commissioner of Patents and Trademarks*